US009805262B2

(12) United States Patent
Kimura

(10) Patent No.: US 9,805,262 B2
(45) Date of Patent: Oct. 31, 2017

(54) HEAD MOUNTED DISPLAY DEVICE, IMAGE DISPLAY SYSTEM, AND METHOD OF CONTROLLING HEAD MOUNTED DISPLAY DEVICE

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 106 days.

(21) Appl. No.: 14/564,635

(22) Filed: Dec. 9, 2014

(65) Prior Publication Data
US 2015/0186728 A1    Jul. 2, 2015

(30) Foreign Application Priority Data
Dec. 26, 2013  (JP) .................................. 2013-269065

(51) Int. Cl.
   *G09G 5/00*    (2006.01)
   *G06K 9/00*   (2006.01)
   *G02B 27/01*  (2006.01)

(52) U.S. Cl.
   CPC ....... *G06K 9/00671* (2013.01); *G02B 27/017* (2013.01); *G02B 2027/014* (2013.01); *G02B 2027/0132* (2013.01); *G02B 2027/0138* (2013.01); *G02B 2027/0141* (2013.01); *G02B 2027/0178* (2013.01); *G02B 2027/0198* (2013.01)

(58) Field of Classification Search
   CPC .............................. G06T 19/006; G06T 19/00
   USPC ......................................................... 345/633
   See application file for complete search history.

(56) References Cited

U.S. PATENT DOCUMENTS

| 6,335,731 | B1 * | 1/2002 | Yamamoto | .............. A63F 13/10 345/419 |
| 2008/0024392 | A1 * | 1/2008 | Gustafsson | .......... G02B 27/017 345/8 |
| 2011/0158478 | A1 * | 6/2011 | Yamada | ............... G02B 6/0006 382/103 |

(Continued)

FOREIGN PATENT DOCUMENTS

| JP | A-10-147411 | 6/1998 |
| JP | A-2008-15634 | 1/2008 |

(Continued)

OTHER PUBLICATIONS

Henderson, S. J., and Feiner, S. K. Augmented reality in the psychomotor phase of a procedural task. In Proc.ISMAR '11, IEEE Computer Society (2011), 191-200.*

*Primary Examiner* — Jin Ge
(74) *Attorney, Agent, or Firm* — Oliff PLC

(57) ABSTRACT

A head mounted display device includes an image display unit that allows a user to visually recognize image light based on image data as a virtual image and allows the user to visually recognize an outside scenery when worn on a head of the user, an imaging unit that images the outside scenery, and a control unit that, when an imaged image contains a mark image as an image of a specific mark, allows the user to visually recognize the specific virtual image associated with a combination of a type of the mark image and a shape of the mark image using the image display unit.

12 Claims, 9 Drawing Sheets

(56) References Cited

U.S. PATENT DOCUMENTS

| | | | | |
|---|---|---|---|---|
| 2012/0058823 A1* | 3/2012 | Minato | ............... | A63F 13/10 |
| | | | | 463/32 |
| 2012/0139915 A1* | 6/2012 | Muikaichi | ............ | G06T 19/00 |
| | | | | 345/419 |
| 2012/0242694 A1* | 9/2012 | Hotta | ................ | G02B 27/01 |
| | | | | 345/633 |
| 2013/0049976 A1* | 2/2013 | Maggiore | ............ | G06T 19/006 |
| | | | | 340/686.1 |
| 2013/0278631 A1* | 10/2013 | Border | .............. | G02B 27/017 |
| | | | | 345/633 |
| 2015/0192774 A1* | 7/2015 | Watanabe | ........... | B65G 1/1375 |
| | | | | 345/8 |

FOREIGN PATENT DOCUMENTS

| JP | B1-5334145 | 11/2013 |
|---|---|---|
| WO | WO 2014/002686 A1 | 1/2014 |

\* cited by examiner

HEAD MOUNTED DISPLAY DEVICE, IMAGE DISPLAY SYSTEM, AND METHOD OF CONTROLLING HEAD MOUNTED DISPLAY DEVICE

BACKGROUND

1. Technical Field

The present invention relates to a head mounted display device.

2. Related Art

Head mounted display devices (head mounted displays, HMDs) as display devices worn on heads have been known. For example, the head mounted display device generates image light representing an image using a liquid crystal display and a light source, guides the generated image light to an eye of a user using a projection system and a light guide plate, and thereby, allows the user to visually recognize a virtual image. Further, in a picking system using barcodes or the like, a user is allowed to visually recognize information using a virtual image by the head mounted display device, and thereby, a picking operation is streamlined.

Patent Document 1 (JP-A-10-147411) discloses a technology, when a user wearing a head mounted display device performs a picking operation of acquiring products stored on the shelves, of allowing the user to visually recognize images of products corresponding to shelf numbers in addition to the shelf numbers of the shelves visually recognized by the user. Further, Patent Document 2 (JP-A-2008-15634) discloses a technology, in a system of providing information related to products, when a user visually recognizes a predetermined product name in a list of a plurality of product names for a certain period of time or more, of allowing the user to visually recognize information related to the product name visually recognized as an image. Furthermore, Patent Document 3 (Japanese Patent No. 5334145) discloses a support system for picking operation, when a plurality of codes placed in a storage location of products are imaged by a camera that performs imaging in a line-of-sight direction of a user, of allowing the user to visually recognize an image based on one code selected from the plurality of codes based on the information stored in advance.

However, in the technology disclosed in Patent Document 1, there is a problem that, when the shelf numbers attached to the shelves are smaller and the user and the shelf numbers are apart, it is impossible to allow the user to visually recognize the images of the products because the shelf numbers are not recognized. Further, there is a problem that it is impossible to perform an efficient picking operation only by the product images. In the technology disclosed in Patent Document 2, there is a problem that, when the user desires to visually recognize an image related to a product name, it is necessary to visually recognize the product name on the list for the predetermined period of time or more and take time to visually recognize the image. In the technology disclosed in Patent Document 3, for the user to visually recognize an image based on a code, it is necessary to register information in advance and there is room for improvement in user-friendliness. The problems are not limited to the field of the picking system, but common in other fields including e.g., route guidance to a destination or the like.

SUMMARY

An advantage of some aspects of the invention is to solve at least a part of the problems described above and the invention can be implemented as the following aspects.

(1) An aspect of the invention provides a head mounted display device. The head mounted display device includes an image display unit that allows a user to visually recognize image light based on image data as a virtual image and allows the user to visually recognize an outside scenery when worn on a head of the user, an imaging unit that images the outside scenery, and a control unit that, when an imaged image contains a mark image as an image of a specific mark, allows the user to visually recognize the specific virtual image associated with a combination of a type of the mark image and a shape of the mark image using the image display unit. According to the head mounted display device of the aspect, the specific virtual image corresponding to a positional relationship between the user and the imaged specific mark specified in response to the shape of the imaged mark image, and thereby, the user may virtually recognize the optimal virtual image in response to the type and the positional relationship of the imaged specific mark and may efficiently perform various operations based on the visually recognized virtual images.

(2) In the head mounted display device of the aspect described above, the specific virtual image may be associated with a combination of the type of the mark image and a size of the mark image as the shape of the mark image. According to the head mounted display device of the aspect, even when the same specific mark is imaged, a plurality of specific virtual images may be visually recognized by the user in response to the specified distances, and thereby, even one specific marker may provide more information suitable for the positional relationship with the user to the user.

(3) In the head mounted display device of the aspect described above, the control unit may set a distance from the image display unit to a location where the specific virtual image is formed to be equal to a distance from the image display unit to the specific mark specified based on the combination of the type of the mark image and the size of the mark image. According to the head mounted display device of the aspect, the specific virtual image may be formed in the location where the user easily and visually recognizes the virtual image, and thereby, the specific virtual image may be promptly and visually recognized by the user.

(4) In the head mounted display device of the aspect described above, the specific virtual image may be associated with a combination of an order of imaging of the one mark image contained in each of a plurality of imaged images, the type of the mark image, and the shape of the mark image. According to the head mounted display device of the aspect, of the plurality of mark images, only the specific virtual image corresponding to the specific mark along the order of imaging is visually recognized by the user, and thereby, virtual images related to various operations in the different order may not be visually recognized by the user and efficient operations may be performed by the user.

(5) In the head mounted display device of the aspect described above, the control unit may allow the user to visually recognize an area virtual image corresponding to a predetermined area in the imaged image using the image display unit, and allow the user to visually recognize the specific virtual image associated with the combination of the mark image contained in the predetermined area using the image display unit. According to the head mounted display device of the aspect, a specific mark only contained in the imaged image is not detected as a mark image for the user to visually recognize a specific virtual image, and the load of the processing on the head mounted display device may be reduced. Further, detection of mark images not intended by the user may be suppressed and specific virtual images corresponding to various operations with higher accuracy may be visually recognized by the user.

(6) In the head mounted display device of the aspect described above, when the imaged image contains a plurality of the mark images, the control unit may allow the user to visually recognize the specific virtual image associated with the combination of the mark image having the maximum size of the plurality of the mark images using the image display unit. According to the head mounted display device of the aspect, the maximum mark image is automatically detected from the plurality of mark images, and thereby, the specific marker closest to the user may be automatically detected and convenience of the user may be improved.

(7) In the head mounted display device of the aspect described above, when the imaged image contains a plurality of the mark images, the control unit may allow the user to visually recognize the specific virtual image associated with the combination of the one mark image selected based on priority set for the specific mark using the image display unit. According to the head mounted display device of the aspect, of the plurality of mark images contained in the imaging range, the specific virtual image corresponding to the mark image stored in advance may be automatically and visually recognized by the user, and thereby, visual recognition by the user of erroneous specific virtual images of various operations may be reduced and efficient operations may be performed by the user.

(8) In the head mounted display device of the aspect described above, the specific virtual image may be associated with a combination of a time when the imaged image contains the mark image, the type of the mark image, and the shape of the mark image. According to the head mounted display device of the aspect, a specific mark only contained in the imaged image is not detected as a mark image for the user to visually recognize a specific virtual image, and the load of the processing on the head mounted display device may be reduced. Further, detection of mark images not intended by the user may be suppressed and specific virtual images corresponding to various operations with higher accuracy may be visually recognized by the user.

(9) In the head mounted display device of the aspect described above, the specific mark may be formed by a combination of a shape and colors. According to the head mounted display device of the aspect, the specific mark using a plurality of colors is created, and thereby, even the smaller specific mark may provide more information to the user.

(10) In the head mounted display device of the aspect described above, the specific mark may be a two-dimensional mark having an outer frame of a square in which a plurality of areas are in different colors of white and black. According to the head mounted display device of the aspect, the created specific mark is not complex, and thereby, control for displaying a corresponding image by the imaged mark image may be performed more easily. Further, the specific mark is formed in black and white only, and thereby, control with less erroneous detection may be performed.

Not all of the plurality of component elements of the respective aspects of the invention described above are essential. In order to solve part or all of the above described problems or in order to achieve part or all of the advantages described in the specification, some component elements of the plurality of the component elements may be appropriately changed, deleted, replaced by new other component elements, or partially deleted in limitations. Further, in order to solve part or all of the above described problems or in order to achieve part or all of the advantages described in the specification, part or all of the technical features contained in one of the aspects of the invention described above may be combined with part or all of the technical features contained in the other one of the aspects of the invention described above into one independent aspect of the invention.

For example, one aspect of the invention may be implemented as a device including one, two, or more of the three elements of the image display unit, the imaging unit, and the control unit. That is, the device may have the image display unit or not. Or, the device may have the imaging unit or not. Or, the device may have the control unit or not. The image display unit may allow a user to visually recognize image light as a virtual image based on image data and allow the user to visually recognize an outside scenery when worn on a head of the user, for example. The imaging unit may image the outside scenery, for example. When an imaged image contains a mark image as an image of a specific mark, the control unit may allow the user to visually recognize the specific virtual image corresponding to a combination of a type of the mark image and a shape of the mark image using the image display unit, for example. The device may be implemented as a head mounted display device, for example, and may be implemented as other devices than the head mounted display device. According to the aspect, at least one of various challenges including improvement and simplification in operability of the device, integration of the device, improvement in convenience of the user using the device may be resolved. Any of part or all of the technical features of the above described respective aspects of the head mounted display device may be applied to the device.

The invention may be implemented in other various aspects than the head mounted display device. For example, the invention may be implemented in forms of a method of controlling the head mounted display device, an image display system and a head mounted display system, a computer program for realization of the head mounted display system and the image display system, a recording medium recording the computer program, data signals embodied within carrier wave containing the computer program, etc.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

A-1. Configuration of Head Mounted Display Device

Figure 1:
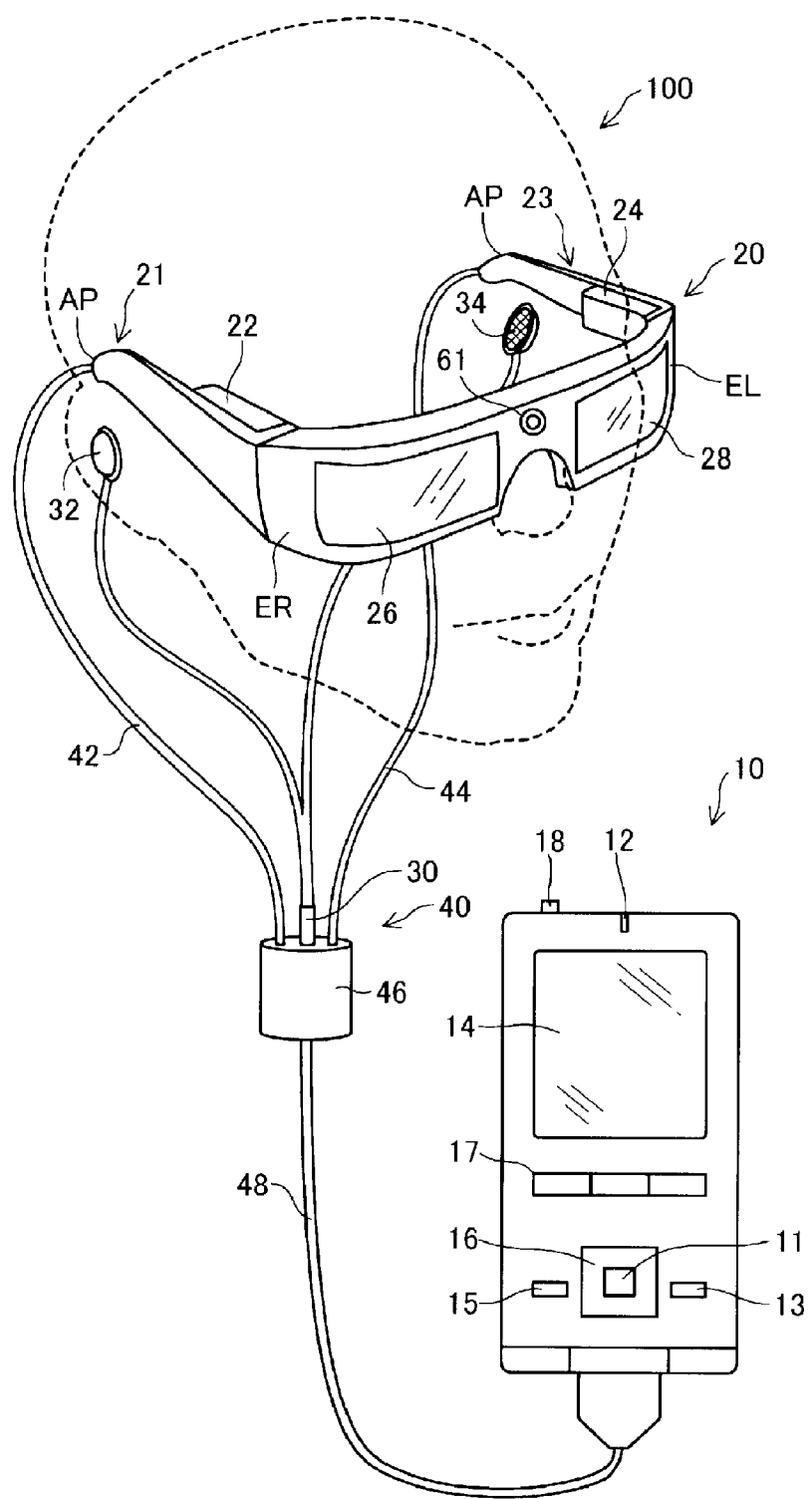
FIG. 1 is an explanatory diagram showing an outer configuration of a head mounted display device.

FIG. 1 is an explanatory diagram showing an outer configuration of a head mounted display device 100. The head mounted display device 100 is a display device worn on a head and also called a head mounted display (HMD). The head mounted display device 100 of the embodiment is an optically-transmissive head mounted display device that enables visual recognition of a virtual image and direct visual recognition of an outside scenery. Note that, in the specification, the virtual image visually recognized by the user using the head mounted display device 100 is also referred to as "displayed image" for convenience. Further, output of image light generated based on image data is also referred to as "display of image".

The head mounted display device 100 includes an image display unit 20 which allows the user to visually recognize a virtual image when worn on the head of the user, and a control unit 10 (controller 10) that controls the image display unit 20.

The image display unit 20 is a wearable unit worn on the head of the user and has a spectacle shape in the embodiment. The image display unit 20 includes a right holding part 21, a right display drive part 22, a left holding part 23, a left display drive part 24, a right optical image display part 26, a left optical image display part 28, and a camera 61. The right optical image display part 26 and the left optical image display part 28 are provided to be located in front of the right and left eyes of the user when the user wears the image display unit 20, respectively. One end of the right optical image display part 26 and one end of the left optical image display part 28 are connected to each other in a location corresponding to the glabella of the user when the user wears the image display unit 20.

The right holding part 21 is a member provided to extend from an end part ER as the other end of the right optical image display part 26 to the location corresponding to the temporal part of the user when the user wears the image display unit 20. Similarly, the left holding part 23 is a member provided to extend from an end part EL as the other end of the left optical image display part 28 to the location corresponding to the temporal part of the user when the user wears the image display unit 20. The right holding part 21 and the left holding part 23 hold the image display unit 20 on the head of the user like temples of spectacles.

The right display drive part 22 and the left display drive part 24 are provided at the sides opposed to the head of the user when the user wears the image display unit 20. Note that, as below, the right holding part 21 and the left holding part 23 are also collectively and simply referred to as "holding parts", the right display drive part 22 and the left display drive part 24 are also collectively and simply referred to as "display drive parts", and the right optical image display part and the left optical image display part 28 are also collectively and simply referred to as "optical image display parts".

The display drive parts 22, 24 include liquid crystal displays 241, 242 (hereinafter, also referred to as "LCDs 241, 242"), projection systems 251, 252, and the like (see FIG. 2). The details of the configurations of the display drive parts 22, 24 will be described later. The optical image display parts 26, 28 as optical members include light guide plates 261, 262 (see FIG. 2) and a dimming plate. The light guide plates 261, 262 are formed using a light-transmissive resin material or the like and guide image lights output from the display drive parts 22, 24 to the eyes of the user. The dimming plate is an optical device having a thin plate shape and provided to cover the front side of the image display unit 20 as the opposite side to the sides of the eyes of the user. The dimming plate protects the light guide plates 261, 262 and suppresses damage, attachment of dirt, or the like to the light guide plates 261, 262. Further, by adjustment of light transmittance of the dimming plate, the amount of outside light entering the eyes of the user may be adjusted and the ease of visual recognition of the virtual image may be adjusted. Note that the dimming plate is dispensable.

A camera 61 is provided in a location corresponding to the glabella of the user when the user wears the image display unit 20. Accordingly, the camera 61 images an outside scenery as a scenery outside in a line-of-sight direction of the user and acquires an imaged image when the user wears the image display unit 20 on the head. The camera 61 is a monocular camera, or may be a stereo camera. The camera 61 corresponds to an imaging unit in the appended claims.

The image display unit 20 further has a connection unit 40 for connecting the image display unit 20 to the control unit 10. The connection unit 40 includes a main body cord 48 connected to the control unit 10, a right cord 42, a left cord 44, and a coupling member 46. The right cord 42 and the left cord 44 are cords bifurcated from the main body cord 48. The right cord 42 is inserted into a casing of the right holding part 21 from an end part AP in the extension direction of the right holding part 21 and connected to the right display drive part 22. Similarly, the left cord 44 is inserted into a casing of the left holding part 23 from an end part AP in the extension direction of the left holding part 23 and connected to the left display drive part 24. The coupling member 46 is provided at the bifurcation point of the main body cord 48 and the right cord 42 and the left cord 44, and has a jack for connection of an earphone plug 30. From the earphone plug 30, a right earphone 32 and a left earphone 34 extend.

The image display unit 20 and the control unit 10 perform transmission of various signals via the connection unit 40. Connectors (not shown) fitted in each other are respectively provided in the end part in the main body cord 48 opposite to the coupling member 46 and the control unit 10. By fit/unfit of the connector of the main body cord 48 and the connector of the control unit 10, the control unit 10 and the image display unit 20 are connected or disconnected. For example, metal cables and optical fibers may be employed for the right cord 42, the left cord 44, and the main body cord 48.

The control unit 10 is a device for controlling the head mounted display device 100. The control unit 10 includes an enter key 11, a lighting part 12, a display change key 13, a brightness change key 15, an arrow key 16, a menu key 17, a power switch 18, and a track pad 14. The enter key 11 detects a press operation and outputs a signal for deciding the contents operated in the control unit 10. The lighting part 12 notifies the user of the operation status of the head mounted display device 100 by its emission state. The operation status of the head mounted display device 100 includes ON/OFF of power, for example. As the lighting part 12, for example, an LED (Light Emitting Diode) is used. The display change key 13 detects a press operation and outputs a signal for switching the display mode of content video between 3D and 2D, for example. The brightness change key 15 detects a press operation and outputs a signal for increasing and decreasing the brightness of the image display unit 20. The arrow key 16 detects a press operation for the key corresponding to up, down, right and left and outputs a signal in response to the detected operation. The power switch 18 detects a slide operation of the switch, and thereby, switches the power-on state of the head mounted display device 100.

The track pad 14 detects a touch operation of a finger by the user on the operation surface and outputs a signal in response to the detected operation. As the track pad 14, various track pads of electrostatic type, pressure detection type, and optical type may be employed.

Figure 2:
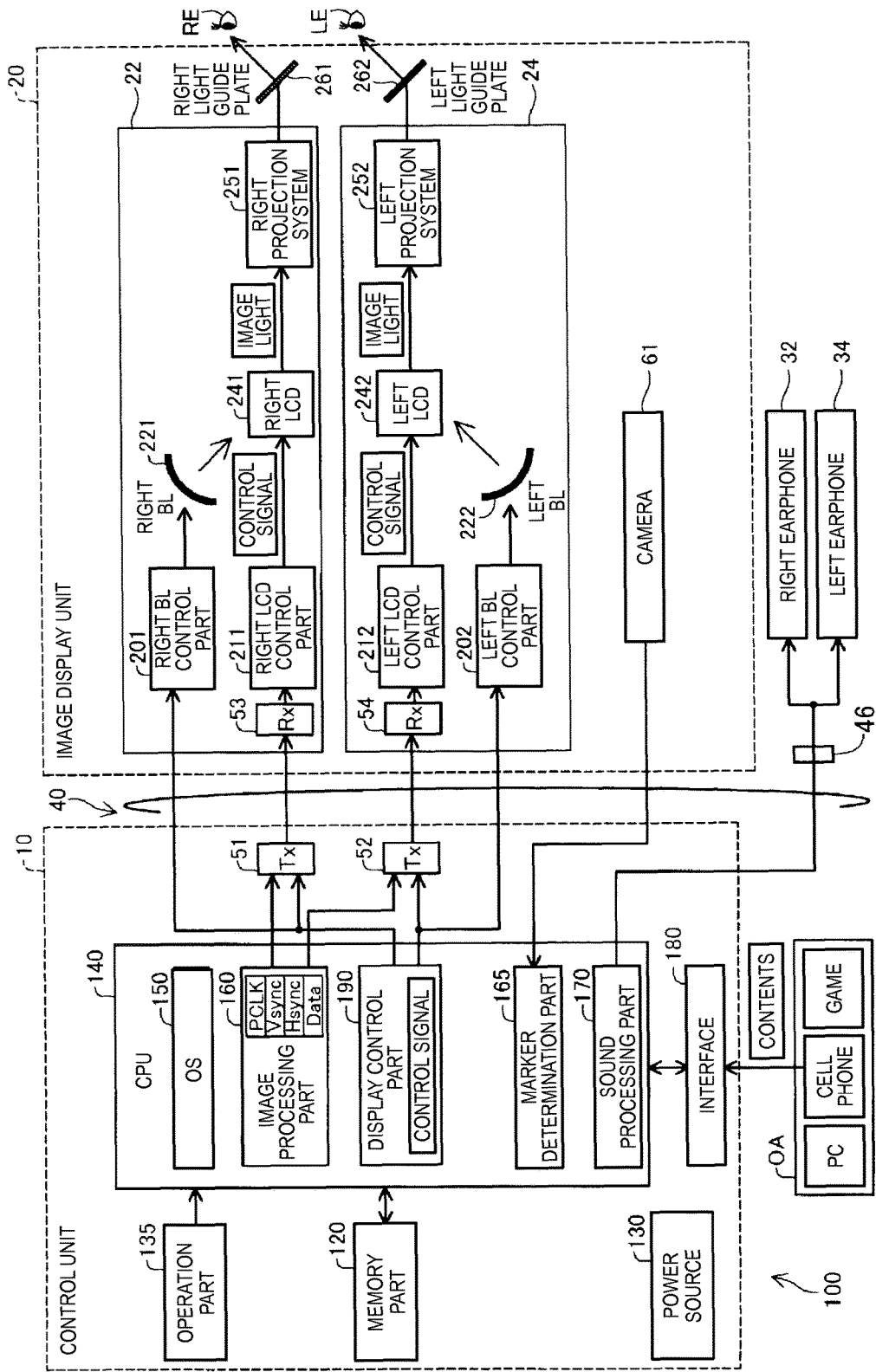
FIG. 2 is a block diagram functionally showing a configuration of the head mounted display device.

FIG. 2 is a block diagram functionally showing a configuration of the head mounted display device 100. As shown in FIG. 2, the control unit 10 has an operation part 135, a power source 130, a memory part 120, a CPU 140, an interface 180, a transmission part 51 (Tx 51), and a transmission part 52 (Tx 52). The operation part 135 receives operations by the user and includes the enter key 11, the display change key 13, the track pad 14, the brightness change key 15, the arrow key 16, the menu key 17, and the power switch 18.

The power source 130 supplies power to the respective units of the head mounted display device 100. As the power source 130, for example, a secondary cell may be used. The memory part 120 stores various computer programs. The memory part 120 includes a ROM, a RAM, or the like. The memory part 120 stores markers detected by a marker determination part 165, which will be described later, and image data representing images corresponding to the respective markers and displayed on the image display unit 20 in advance. The memory part 120 stores markers related to operation instructions of instruction image display processing, which will be described later. The CPU 140 loads and executes the computer programs stored in the memory part 120, and thereby, functions as an operating system 150 (OS 150), a display control part 190, an image processing part 160, a sound processing part 170, and the marker determination part 165.

The display control part 190 generates control signals for controlling the right display drive part 22 and the left display drive part 24. Specifically, the display control part 190 individually controls drive ON/OFF of the right LCD 241 by a right LCD control part 211, drive ON/OFF of a right backlight 221 by a right backlight control part 201, drive ON/OFF of the left LCD 242 by a left LCD control part 212, drive ON/OFF of a left backlight 222 by a left backlight control part 202, etc. with the control signals. Thereby, the display control part 190 controls the respective generation and output of image lights by the right display drive part 22 and the left display drive part 24. For example, the display control part 190 may allow both the right display drive part 22 and the left display drive part 24 to generate image lights, allow only one of the parts to generate image light, or allow neither to generate image lights. The display control part 190 transmits the respective control signals for the right LCD control part 211 and the left LCD control part 212 via the transmission parts 51 and 52. Further, the display control part 190 transmits the respective control signals for the right backlight control part 201 and the left backlight control part 202.

The image processing part 160 acquires image signals contained in contents. The image processing part 160 separates synchronizing signals including a vertical synchronizing signal VSync and a horizontal synchronizing signal HSync from the acquired image signals. Further, the image processing part 160 generates clock signals PCLK using a PLL (Phase Locked Loop) circuit or the like (not shown) in response to the periods of the separated vertical synchronizing signal VSync and horizontal synchronizing signal HSync. The image processing part 160 converts the analog image signals from which the synchronizing signals have been separated into digital image signals using an A/D converter circuit or the like (not shown). Then, the image processing part 160 stores the converted digital image signals as image data (RGB data) of an object image in a DRAM within the memory part 120 with respect to each frame. Note that the image processing part 160 may execute image processing such as resolution conversion processing, various kinds of tone correction processing including adjustment of brightness and saturation, keystone correction processing, or the like on the image data as necessary.

The image processing part 160 transmits the respective generated clock signals PCLK, vertical synchronizing signal VSync, horizontal synchronizing signal HSync, and the image data stored in the DRAM within the memory part 120 via the transmission parts 51, 52. Note that the image data transmitted via the transmission part 51 is also referred to as "right-eye image data" and the image data transmitted via the transmission part 52 is also referred to as "left-eye image data". The transmission parts 51, 52 function as transceivers for serial transmission between the control unit 10 and the image display unit 20.

The marker determination part 165 displays an area image showing a certain area in an image display maximum range PN (hereinafter, simply referred to as "display range PN") that may be visually recognized by the user in the optical image display parts 26, 28 of the image display unit 20. Note that the area image corresponds to an area virtual image in the appended claims. The marker determination part 165 determines whether or not there is an image of a marker stored in the memory part 120 in a range corresponding to the area image in the imaged image of the camera 61. If the imaged image contains the image of the marker, but the image of the whole marker is not contained within the area image, the marker determination part 165 determines that the imaged image does not contain the marker. Further, if determining that the marker is contained within the area image, the marker determination part 165 determines whether or not the imaged marker is a marker related to an operation instruction of the instruction image display processing to be described later by checking the marker against the markers stored in the memory part 120. The marker is an identifier including a barcode and a QR code (registered trademark) one-dimensionally or two-dimensionally represented. As the marker, e.g., an AR marker, an ID marker, an NyID marker, a DataMatrix marker, a frame marker, a split marker, markers having increased amounts of information formed by addition of colors to the identifiers, a marker created by a multidimensional code, a character readable by an OCR or the like are used. The marker corresponds to a specific mark in the appended claims.

If determining that the imaged image contains the image of the marker in the range of the area image, the marker determination part 165 specifies the type of the marker contained in the imaged image and specifies the shape of the image of the marker. Even when the imaged markers are of the same type, the images of the markers may be different in image size or the shapes of the outer frames of the images may be different depending on the positional relationship with the camera 61. For example, in the case where the distance between the imaged marker and the camera 61 is longer, the size of the image of the imaged marker is smaller than that in the case where the distance is not longer. Further, in the case where the imaged marker is located diagonally ahead of the camera 61, the marker is imaged as an image with a depth, and, when the outer frame of the marker is square, for example, the outer frame of the image of the marker is imaged as a trapezoidal image. As described above, the shape of the image of the marker varies depending on the positional relationship between the imaged marker and the camera 61, and the marker determination part 165 may specify the distance between the user and the imaged marker, the location of the imaged marker with respect to the line-of-sight direction of the user, or the like using the image of the marker. The marker determination part 165 displays an image corresponding to a combination of the type of the specified marker and the shape of the image of the marker in the display range PN. The user may obtain information from the image displayed in the display range PN and make various judgments. The image of the imaged marker corresponds to a mark image in the appended claims.

Further, the marker determination part 165 controls an angle of convergence, and thereby, sets the location where the virtual image visually recognized by the user is formed. That is, the marker determination part 165 allows the virtual image visually recognized by the user to be visually recognized as if the image exists in a location at a predetermined distance from the user. In the embodiment, the marker determination part 165 sets the distance from the image display unit 20 to the location where the virtual image is formed to be equal to the distance from the camera 61 to the imaged marker. Note that, in the appended claims, the description that a distance from an image display unit to a location where a specific virtual image is formed is equal to a distance from the image display unit to a specific mark is not limited to that the respective distances are completely the same, but includes the distance that falls within ±10% around a center value as the distance between the imaging unit and the specific mark. For example, when the distance from the camera 61 to the imaged marker is five meters (m), if the distances from the optical image display parts 26, 28 to the location where the virtual image is formed are from 4.5 m to 5.5 m, the distances correspond to the same distance in the appended claims.

The sound processing part 170 acquires sound signals contained in the contents, amplifies the acquired sound signals, and supplies the signals to a speaker (not shown) within the right earphone 32 and a speaker (not shown) within the left earphone 34 connected to the coupling member 46. Note that, for example, in the case where the Dolby (registered trademark) system is employed, processing on the sound signals is performed and different sounds at the varied frequencies or the like are output from the respective right earphone 32 and left earphone 34.

The interface 180 (FIG. 2) is an interface for connecting various external devices OA as supply sources of contents to the control unit 10. The external devices OA include a personal computer (PC), a cell phone terminal, a game terminal, etc., for example. As the interface 180, for example, a USB interface, a micro USB interface, an interface for memory card, or the like may be used.

The image display unit 20 includes the right display drive part 22, the left display drive part 24, the right light guide plate 261 as the right optical image display part 26, and the left light guide plate 262 as the left optical image display part 28.

The right display drive part 22 includes a reception part 53 (Rx 53), the right backlight control part 201 (right BL control part 201) and the right backlight 221 (right BL 221) that function as a light source, the right LCD control part 211 and the right LCD 241 that function as a display device, and the right projection system 251. The right backlight control part 201 and the right backlight 221 function as the light source. The right LCD control part 211 and the right LCD 241 function as the display device. Note that the right backlight control part 201, the right LCD control part 211, the right backlight 221, and the right LCD 241 are also collectively referred to as "image light generation part".

The reception part 53 functions as a receiver for serial transmission between the control unit 10 and the image display unit 20. The right backlight control part 201 drives the right backlight 221 based on the input control signal. The right backlight 221 is a light emitter such as an LED or electroluminescence (EL), for example. The right LCD control part 211 drives the right LCD 241 based on the clock signal PCLK, the vertical synchronizing signal VSync, the horizontal synchronizing signal HSync, and the right-eye image data input via the reception part 53. The right LCD 241 is a transmissive liquid crystal panel in which a plurality of pixels are arranged in a matrix.

The right projection system 251 includes a collimator lens that brings the image light output from the right LCD 241 into parallelized luminous fluxes. The right light guide plate 261 as the right optical image display part 26 guides the image light output from the right projection system 251 to the right eye RE of the user while reflecting the light along a predetermined optical path. Note that the right projection system 251 and the right light guide plate 261 are also collectively referred to as "light guide part".

The left display drive part 24 has the similar configuration as that of the right display drive part 22. The left display drive part 24 includes a reception part 54 (Rx 54), the left backlight control part 202 (left BL control part 202) and the left backlight 222 (left BL 222) that function as a light source, the left LCD control part 212 and the left LCD 242 that function as a display device, and the left projection system 252. The left backlight control part 202 and the left backlight 222 function as the light source. The left LCD control part 212 and the left LCD 242 function as the display device. Note that the left backlight control part 202, the left LCD control part 212, the left backlight 222, and the left LCD 242 are also collectively referred to as "image light generation part". Further, the left projection system 252 includes a collimator lens that brings the image light output from the left LCD 242 into parallelized luminous fluxes. The left light guide plate 262 as the left optical image display part 28 guides the image light output from the left projection system 252 to the left eye LE of the user while reflecting the light along a predetermined optical path. Note that the left projection system 252 and the left light guide plate 262 are also collectively referred to as "light guide part".

Figure 3:
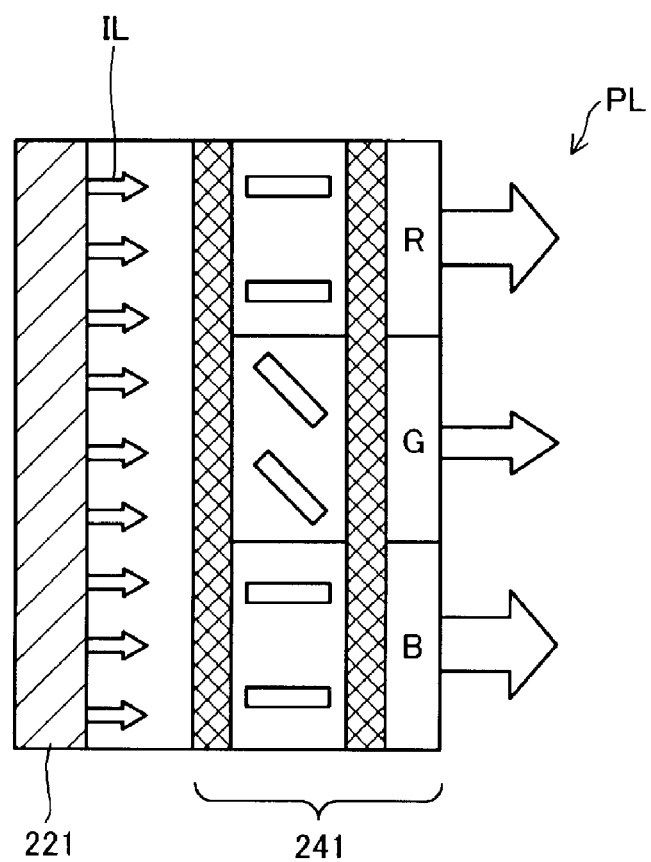
FIG. 3 is an explanatory diagram showing image lights output by an image light generation part.

FIG. 3 is an explanatory diagram showing image lights output by the image light generation part. The right LCD 241 drives the liquid crystal in the respective pixel positions arranged in the matrix to change the transmittance of the light to be transmitted through the right LCD 241, and thereby, modulates illumination light IL radiated from the right backlight 221 into effective image light PL representing an image. This applies to the left side. Note that the backlight system is employed in the embodiment as shown in FIG. 3, however, a configuration that outputs image light using the front light system or the reflection system may be employed.

A-2. Instruction Image Display Processing

Figure 4:
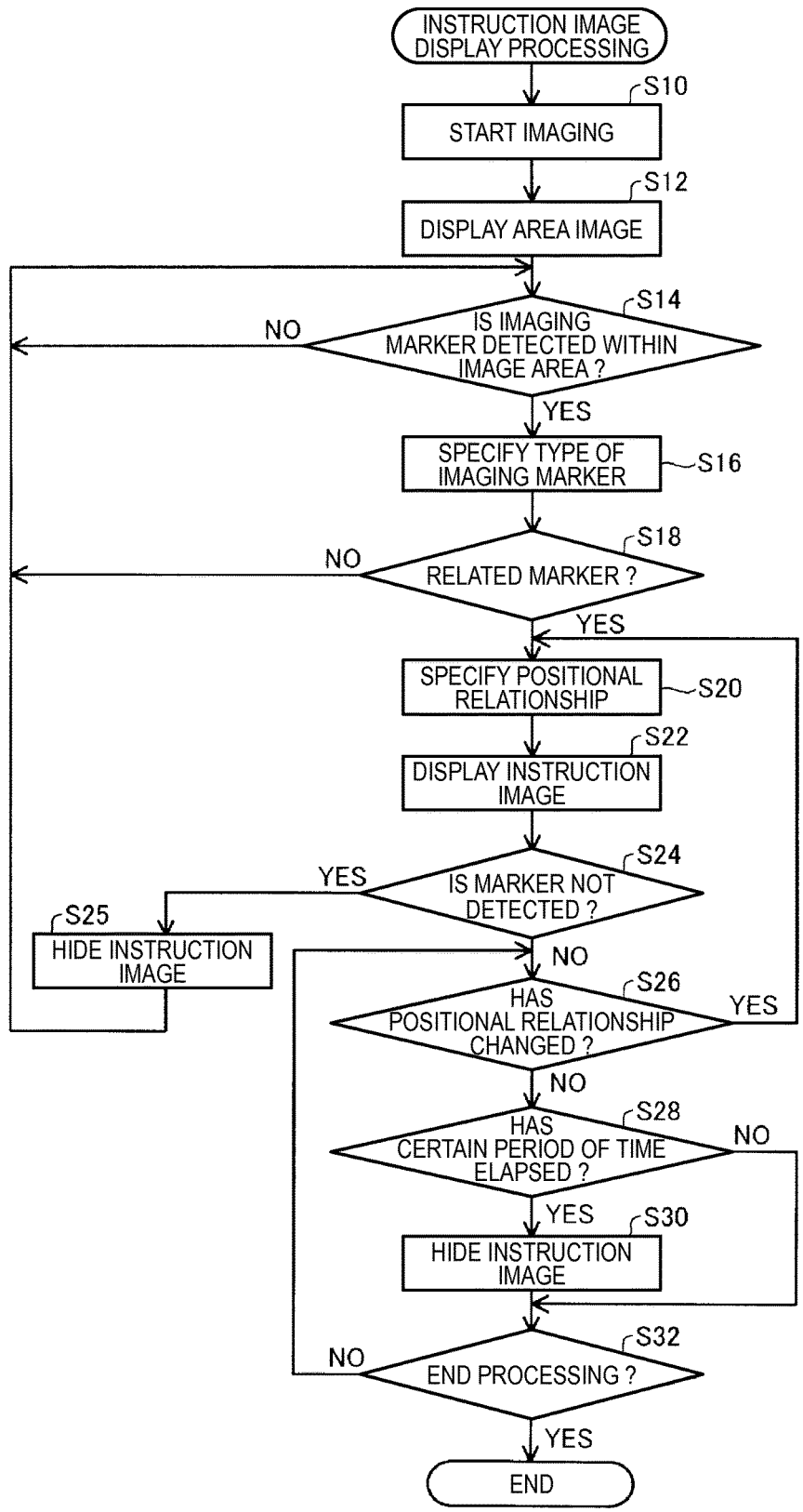
FIG. 4 is an explanatory diagram showing a flow of instruction image display processing.
Figure 5:
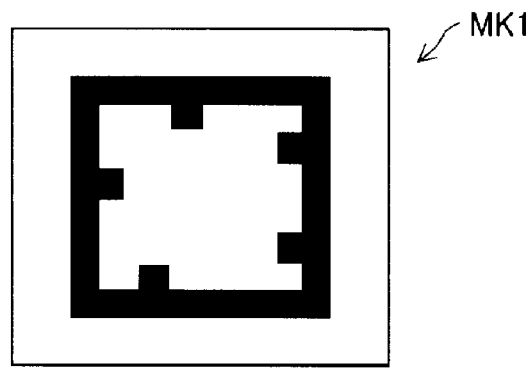
FIG. 5 is an explanatory diagram showing an example of a marker.

FIG. 4 is an explanatory diagram showing a flow of instruction image display processing. The instruction image display processing is processing of sequentially displaying instruction images showing operation instructions in the display range PN of the image display unit 20 along the preset operation instructions in response to the detected markers. In the embodiment, a plurality of different markers placed in the distribution center in which a large number of industrial products are stored are detected, and thereby, images of operation instructions corresponding to the images of the markers are displayed in the display range PN. FIG. 5 is an explanatory diagram showing an example of a marker. As shown in FIG. 5, in markers MK1 used in the embodiment, different images are formed with respect to each marker in square outer frames. In the marker MK1, the image formed in the square includes a white area and a black area. Note that the sizes of the outer frames in image data of the markers stored in the memory part 120 differ from marker to marker.

Figure 6:
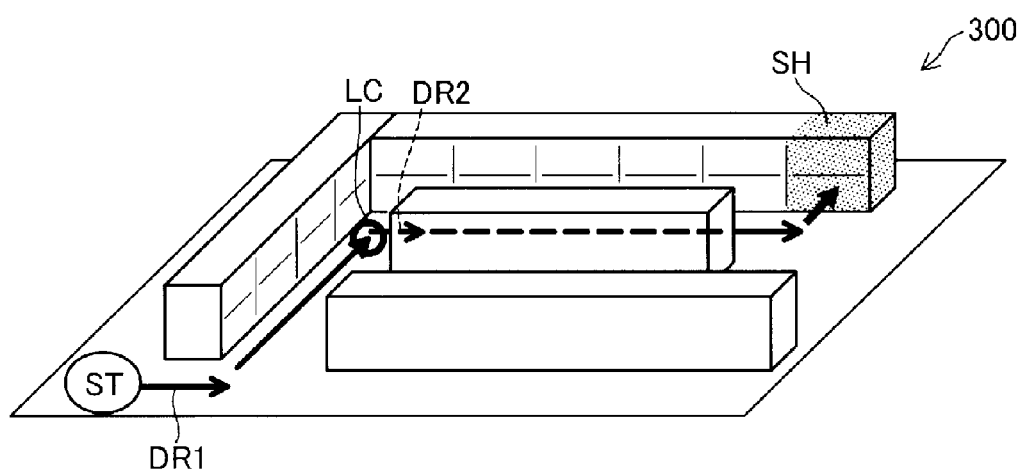
FIG. 6 is a schematic diagram with respect to a path that a user takes in a distribution center.

FIG. 6 is a schematic diagram with respect to a path that a user takes in a distribution center 300. FIG. 6 schematically shows the entire of the distribution center 300. First, the user is at a start point ST near the entrance of the distribution center 300 and faces in a direction DR1 within the distribution center 300. When the markers placed in the respective locations of the distribution center 300 are detected, the user moves forward in directions of arrows shown in FIG. 6 according to the instruction images displayed in response to the images of the detected markers, and moves to a shelf SH as a destination. After moving to the shelf SH, the user acquires a component stored on the shelf SH as memorized as the operation instruction in advance. The details of a relay point LC and a direction DR2 shown in FIG. 6 will be described later.

In the instruction image display processing, first, the camera 61 starts imaging of an outside scenery (step S10 in FIG. 4). Then, the marker determination part 165 displays an area image in the display range PN (step S12). Then, the marker determination part 165 monitors detection of an image of a marker within the area image (step S14). If any image of a marker is not detected within the area image (step S14: NO), the marker determination part 165 continues to monitor detection of an image of a marker (step S14). In the embodiment, if a marker is continuously imaged within the area image in a predetermined period of time, the marker determination part 165 detects the marker as a marker. Accordingly, a marker instantaneously contained within the area image is not detected as a marker. In the processing at step S14, if an image of a marker is detected within the area image (step S14: YES), the marker determination part 165 specifies a type of the detected marker (step S16).

Figure 7:
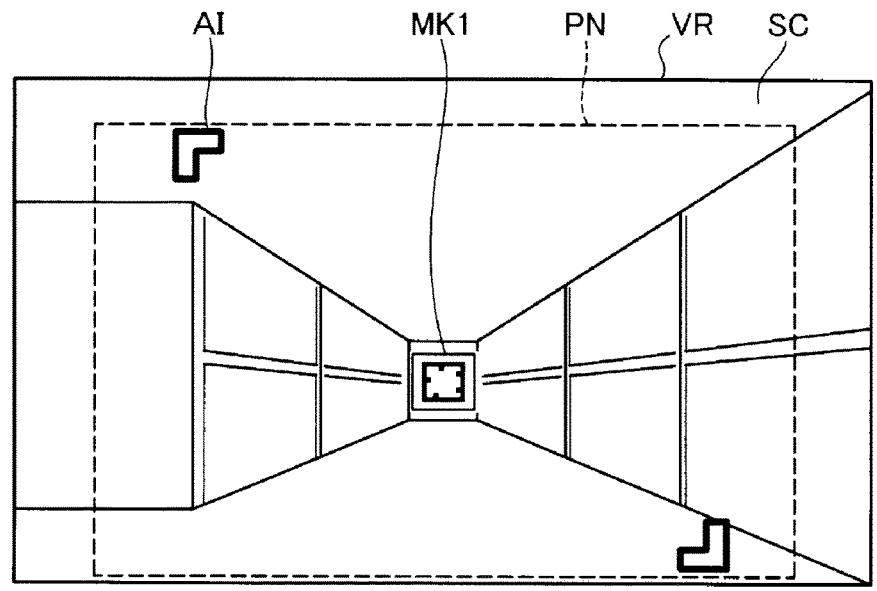
FIG. 7 is an explanatory diagram showing a visual range of the user when a marker is detected at a start point.

FIG. 7 is an explanatory diagram showing a visual range VR of the user when a marker is detected at the start point ST. FIG. 7 shows the visual range VR visually recognized by the user when the user at the start point ST faces in the direction DR1. In this case, the visual range VR of the user contains an outside scenery SC through the optical image display parts 26, 28 of the image display unit 20 and an area image AI displayed by the image display unit 20. The outside scenery SC contains the marker MK1 placed within the distribution center 300. The marker MK1 as a marker is detected within the area image AI, and the marker determination part 165 specifies the type of the marker of the marker MK1. Note that the image display unit 20 may display an image in a range inside of the display range PN shown in FIG. 5. In FIG. 5, for convenience, the range showing the display range PN is shown by a broken line, however, the broken line showing the display range PN is not displayed and not visually recognized by the user.

If the type of the marker MK1 as the marker is specified (step S16 in FIG. 4), the marker determination part 165 determines whether or not the marker MK1 is a marker related to an operation instruction stored in the head mounted display device 100 in advance (step S18). In the embodiment, if the related markers are detected along the sequence of the operation instructions stored in advance, the marker determination part 165 displays images corresponding to the detected markers. Accordingly, if the detected marker is not related to any operation instruction or related to an operation instruction, but not along the sequence of the operation instructions, the part determines that the detected marker is a marker not related to the operation instruction. Further, if the area image AI contains a plurality of images of markers, the marker determination part 165 detects only the related marker along the sequence of the operation instructions. In the processing at step S18, if a determination that the marker MK1 is not a marker related to the stored operation instruction is made (step S18: NO), the marker determination part 165 detects an image of a marker different from the marker MK1 again (step S14).

In the processing at step S18, if a determination that the marker MK1 is a marker related to the operation instruction is made (step S18: YES), the marker determination part 165 specifies the shape of the marker MK1, and thereby, specifies a positional relationship between the image display unit 20 and the marker MK1 placed in the distribution center 300 (step S20). Then, the marker determination part 165 allows the image display unit 20 to display an instruction image of the operation instruction corresponding to the specified positional relationship (step S22 in FIG. 4).

Figure 8:
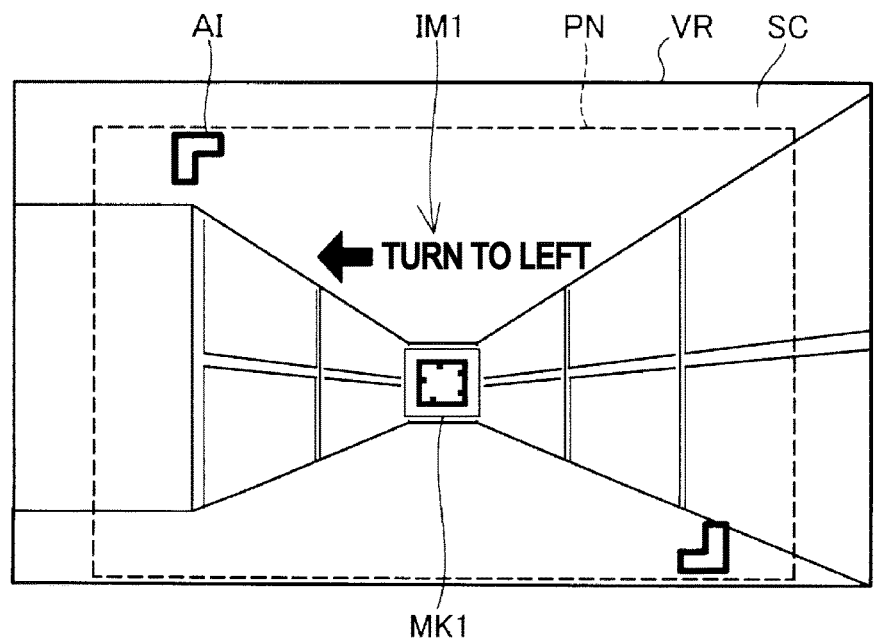
FIG. 8 is an explanatory diagram showing a visual range of the user when an instruction image is displayed at the start point.

FIG. 8 is an explanatory diagram showing a visual range VR of the user when an instruction image IM1 is displayed at the start point ST. FIG. 8 shows the visual range VR visually recognized by the user when the instruction image IM1 corresponding to the marker MK1 is displayed and the user at the start point ST faces in the direction DR1. In this case, unlike the visual range VR shown in FIG. 7, the user visually recognizes the instruction image IM1. The marker determination part 165 compares shapes of outer frames between image data of the marker MK1 stored in advance and the image of the imaged marker MK1. As shown in FIGS. 5 and 8, the outer frames of the image data of the marker MK1 and the image of the imaged marker MK1 are square. Accordingly, the marker determination part 165 specifies an existence of the marker MK1 in front of the camera 61 as a positional relationship of the image display unit 20 with the marker MK1. Further, the marker determination part 165 compares sizes between the image data of the marker MK1 and the image of the imaged marker MK1, and thereby, specifies a distance between the image display unit 20 and the marker MK1 placed in the distribution center 300 as a positional relationship between the image display unit 20 and the marker MK1. Then, the marker determination part 165 allows the image display unit 20 to display the instruction image IM1 stored in advance in response to the specified positional relationship. If the user at the start point ST faces in the direction DR1 (FIG. 6), the marker determination part 165 displays a character image of "TURN TO LEFT" and an arrow pointing to the left as the instruction image IM1 to be visually recognized in a location at the same distance with that to the marker MK1. The instruction image IM1 and an instruction image IM2, an instruction image IM3, which will be described later, correspond to a specific image in the appended claims.

If the instruction image IM1 is displayed (step S22 in FIG. 4), the marker determination part 165 monitors a change to a non-detection state in which the detected marker MK1 is no longer detected by changes in location and orientation of the user (step S24). If the marker MK1 is continuously detected (step S24: NO), the marker determination part 165 determines whether or not the positional relationship between the image display unit 20 and the marker MK1 placed in the distribution center 300 has changed (step S26). For example, if the user moves to a location closer to the marker MK1 along the direction DR1 than the start point ST while facing in the direction DR1 and a determination that the positional relationship between the image display unit 20 and the marker MK1 has changed is made (step S26: YES), the marker determination part 165 specifies the positional relationship between the image display unit 20 and the marker MK1 (step S20). As the specified positional relationship, if the distance between the image display unit 20 and the marker MK1 is smaller than a predetermined value, the marker determination part 165 hides the image of the instruction image IM1 and newly displays a character image of "RETURN" as another instruction image stored in advance (step S22). The marker determination part 165 displays "RETURN" as the new character image, and thereby, prompts the user to move backward. If the user passes within the distribution center 300 toward the shelf SH according to the newly displayed character image and the state has changed from the detection state to the non-detection state of the marker (step S24: YES), the marker determination part 165 hides the instruction image. Then, again, the marker determination part 165 monitors detection of a marker within the area image AI (step S14).

Figure 9:
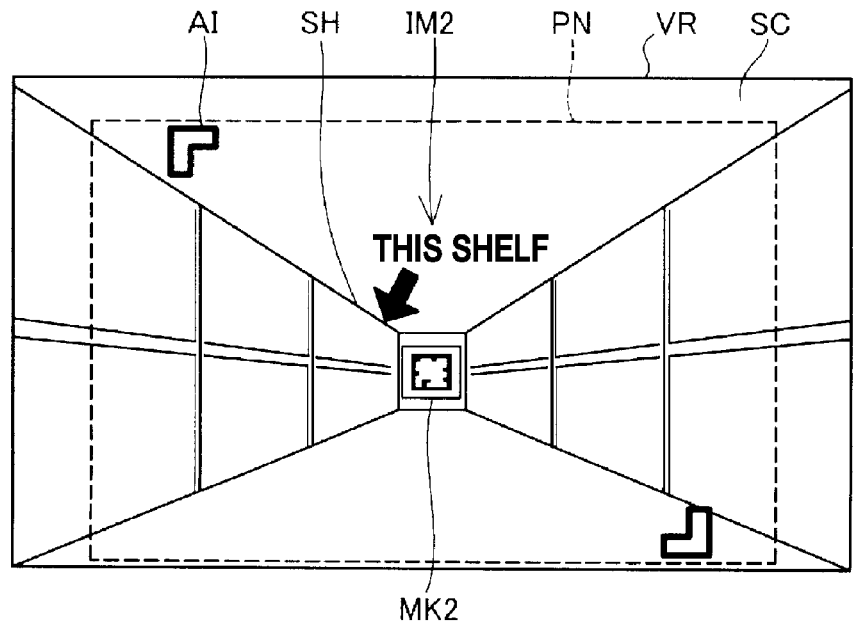
FIG. 9 is an explanatory diagram showing a visual range of the user when an instruction image is displayed at a relay point.

Next, the case where the processing from step S14 to step S24 is repeated, and thereby, the user at the relay point LC shown in FIG. 6 faces in the direction DR2 is explained. FIG. 9 is an explanatory diagram showing a visual range VR of the user when the instruction image IM2 is displayed at the relay point LC. FIG. 9 shows the visual range VR visually recognized by the user when the instruction image IM2 corresponding to the marker MK2 is displayed and the user at the relay point LC faces in the direction DR2. The instruction image IM2 is an instruction image displayed in response to the image display unit 20 and the marker MK2 specified by the marker determination part 165. As shown in FIG. 9, the instruction image IM2 includes an image of an arrow pointing to the shelf SH on which the component to be acquired by the user is stored and a character image of "THIS SHELF". The marker determination part 165 displays the instruction image IM2 to be visually recognized in a location at the same distance with that to the marker MK2. The user is guided to the shelf SH of the distribution center 300 by the instruction images including the instruction image IM2 and the instruction image IM1.

Figure 10:
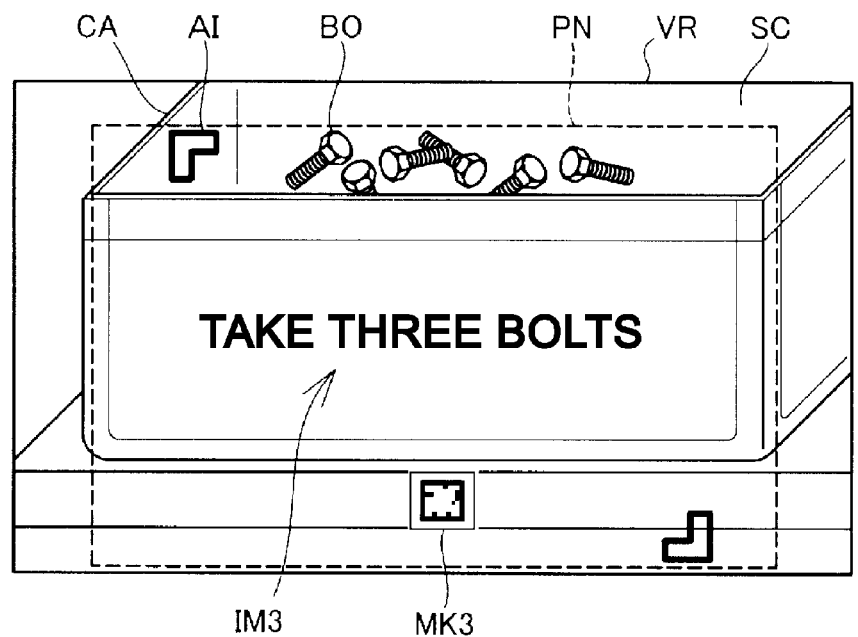
FIG. 10 is an explanatory diagram showing a visual range of the user in front of a shelf.

FIG. 10 is an explanatory diagram showing a visual range VR of the user in front of the shelf SH. As shown in FIG. 10, the user visually recognizes a plurality of bolts BO stored in a case CA placed on the shelf SH, a marker MK3, and the instruction image IM3. The instruction image IM3 is an image displayed in response to a positional relationship between the image display unit 20 and the marker MK3 specified based on an image of the imaged marker MK3 and image data of the marker MK3 stored in advance. The marker determination part 165 displays a character image of "TAKE THREE BOLTS" as the instruction image IM3. The marker determination part 165 displays the instruction image IM3 to be visually recognized in a location at the same distance with that to the marker MK3.

In the processing at step S22 in FIG. 4, if the instruction image IM3 is displayed and the marker MK3 is continuously detected (step S24: YES), the marker determination part 165 monitors a change of the positional relationship between the image display unit 20 and the marker MK3 (step S26). If the positional relationship does not change (step S26: NO), the marker determination part 165 monitors a lapse of a predetermined period of time in the state in which the instruction image IM3 is displayed (step S28). If the predetermined period of time has elapsed (step S28: YES), the marker determination part 165 hides the instruction image IM3 (step S30). In the embodiment, the instruction image IM3 is hidden after the lapse of the predetermined period of time, and thereby, the user may visually recognize the wider outside scenery SC. If the predetermined period of time has not elapsed in the processing at step S28 (step S28: NO) or if the instruction image IM3 is hidden (step S30), the marker determination part 165 determines whether or not to end the instruction image display processing (step S32). If the instruction image display processing is not ended (step S32: NO), the processing at step S26 and subsequent steps is performed. If the operation part 135 receives a predetermined operation to end the instruction image display processing or the operation instruction stored in advance is ended, the marker determination part 165 ends the instruction image display processing (step S32: YES).

As described above, in the head mounted display device 100 in the embodiment, the camera 61 images an outside scenery and acquires an imaged image and, if the imaged image contains a marker, the marker determination part 165 displays an image corresponding to a combination of the type of the detected marker and the shape of the image in the display range PN of the image display unit 20. Accordingly, in the head mounted display device 100 of the embodiment, an image corresponding to a positional relationship between the user and the detected marker specified in response to the shape of the detected marker is displayed, and thereby, the user may visually recognize optimal instruction images in response to the types and the positional relationships of the detected markers and efficiently perform a picking operation or the like.

Further, in the head mounted display device 100 of the embodiment, the marker determination part 165 compares the sizes between image data of the marker MK1 and the image of the detected marker MK1, and thereby, specifies the distance between the image display unit 20 and the marker MK1 placed in the distribution center 300 as the positional relationship between the image display unit 20 and the marker MK1. The marker determination part 165 displays the image corresponding to the combination of the type of the specified marker and the size of the image in the display range PN. Accordingly, in the head mounted display device 100 of the embodiment, even when the same marker MK1 is imaged, a plurality of images may be visually recognized by the user in response to the specified distances, and even one marker may provide more information suitable for the positional relationship with the user to the user.

Furthermore, in the head mounted display device 100 of the embodiment, the marker determination part 165 sets the distances from the optical image display parts 26, 28 to the location where the virtual image is formed to be equal to the distance from the camera 61 to the imaged marker. Accordingly, in the head mounted display device 100 of the embodiment, the virtual image may be formed in the location where the user easily and visually recognizes the virtual image, and the image displayed in the display range PN may be promptly and visually recognized by the user.

Further, in the head mounted display device 100 of the embodiment, if the related markers are detected along the sequence of the flow of the operation instructions stored in advance, the marker determination part 165 displays the image corresponding to the detected markers. Accordingly, in the head mounted display device 100 of the embodiment, only the related markers along the sequence of the operation instructions are detected from the plurality of markers placed in the distribution center 300, and thereby, erroneous operation instructions in a different sequence or the like may be reduced and efficient operations may be performed by the user.

Furthermore, in the head mounted display device 100 of the embodiment, the marker determination part 165 determines whether or not there is an image of a marker stored in the memory part 120 in the range corresponding to the inside of the area image in the imaged image of the camera 61. If the imaged image contains the image of the marker, but the image of the entire of the marker is not contained within the area image, the marker determination part 165 determines that the imaged image does not contain the image of the marker. Moreover, in the head mounted display device 100 of the embodiment, if a marker is continuously imaged within the area image in a predetermined period of time, the marker determination part 165 detects the marker as a marker, and does not detect a marker instantaneously contained within the area image as a marker. Accordingly, in the head mounted display device 100 of the embodiment, a marker only contained in the imaged image is not detected as a marker for displaying a corresponding image, and the load of the processing on the head mounted display device 100 may be reduced. In addition, in the head mounted display device 100 of the embodiment, detection of markers not intended by the user may be suppressed and the user may be prompted by operation instructions with higher accuracy.

Further, in the head mounted display device 100 of the embodiment, if the area image AI in an imaging range contains a plurality of images of markers, the marker determination part 165 detects only the related markers along the sequence of the operation instructions stored in advance. Accordingly, in the head mounted display device 100 of the embodiment, images corresponding to the markers suitable for the operation instructions stored in advance among the plurality of markers in the imaging range are automatically displayed, and thereby, erroneous operation instructions for the user may be reduced and efficient operations may be performed by the user.

Furthermore, in the head mounted display device 100 of the embodiment, in the marker MK1, the image formed in the square includes a white area and a black area, and thereby, the detected marker MK1 is not complex and control for displaying a corresponding image by the detection of the marker MK1 may be performed more easily. In addition, the marker MK1 is formed in black and white only, and thereby, control with less erroneous detection may be performed.

B. Modified Examples

The invention is not limited to the above described embodiment, but may be implemented in various forms without departing from the scope thereof. The following modifications may be made, for example.

B1. Modified Example 1

In the above described embodiment, the case where the marker placed in the distribution center 300 is located in front of the user and the shape of the outer frame of the marker is detected as square is explained as an example, however, the marker is not necessarily located in front of the user. For example, when a marker is detected diagonally ahead of the camera 61, an image prompting the user to change the orientation is displayed, and the user changes the orientation and is located in front of the marker, an image of an operation instruction may be displayed. Further, a setting of not detecting a marker not located in front of the user may be made.

In the above described embodiment, the instruction image corresponding to the detected marker is once displayed and then hidden in the processing at step S25 and step S32 in FIG. 4, however, the instruction image is not necessarily hidden. For example, in the instruction image display processing in the embodiment, the instruction images displayed along the sequence of the operation instructions may not be hidden, but the reduced instruction images may be left in the corner of the display range PN. In the modified example, the instruction images that have been already displayed may be constantly and visually recognized by the user, and errors in the operation instructions for the user may be reduced. Further, when the instruction image is hidden, a number of a countdown of seconds to hiding of the image may be additionally displayed. Furthermore, switching between display and non-display of the instruction image and the time to non-display of the displayed instruction image may be set by the user.

In the above described embodiment, the distance from the image display unit 20 to the location where the virtual image is formed may be set to be equal to the distance from the camera 61 to the detected marker, however, the setting of the distance from the image display unit 20 to the location where the virtual image is formed may be variously modified. For example, regardless of a marker to be detected, a location where a virtual image corresponding to the marker is formed may be set to a location at infinity from the image display unit 20. Further, the location where the virtual image is formed may be freely set by the user operating the operation part 135. Furthermore, the line-of-sight direction of the user may be imaged by a camera different from the camera 61, and the location where the virtual image corresponding to the marker is formed may be set based on the angle of convergence of the line of sight of the user specified based on the line-of-sight direction. In addition, the distance between the image display unit 20 and the user is not specified, but only a positional relationship with respect to the orientations between the marker and the line-of-sight direction of the user may be specified by the type of the detected marker and the shape of the outer frame of the image of the marker, and the image corresponding to the detected marker may be displayed. The distance from the image display unit 20 to the marker and the positional relationship with respect to the orientations between the marker and the line-of-sight direction of the user may be set by the user.

In the above described embodiment, if a marker not along the sequence of the operation instructions is detected, an image corresponding to the detected marker is not displayed, however, a setting of display and non-display of the image corresponding to the detected marker may be variously modified. For example, a marker related to an operation instruction and a marker not related may not be distinguished and an image corresponding to the detected marker may be displayed regardless of the contents of the operation instructions stored in advance. In the modified example, an image corresponding to a marker may be visually recognized by the user even when operation instructions are not stored in advance in the memory part 120. Further, in the instruction image display processing, the determination by the marker determination part 165 as to whether or not the marker is a marker related to an operation instruction is not necessarily made, and the load of the processing on the head mounted display device 100 may be reduced. Furthermore, a marker for which a corresponding image is displayed may be set according to another condition than the sequence of the operation instructions. For example, the detected marker may be a marker for displaying a corresponding image only to a user of the head mounted display device 100 who pays a fee in advance.

Further, in the above described embodiment, the distribution center 300 in which operation instructions are given to the user by display of the images corresponding to the markers is explained as an example, however, the system of displaying images using markers is not limited to that, but may be variously modified. For example, in a museum, a route for viewing paintings and sculptures may be predetermined and markers placed in the path may be detected, and thereby, the route of the user may be shown. These systems may be used not in the museums, but in leisure facilities including amusement parks and shopping malls.

In the above described embodiment, as the images of the operation instructions corresponding to the images of the markers and displayed in the display range PN, the instruction images IM1 of "TURN TO LEFT" and "RETURN" corresponding to the markers MK1 are explained as examples, however, the images corresponding to the images of the imaged markers may be variously modified. For example, when an image of a marker placed in a T-junction in the route in the museum and prompting the user of the head mounted display device 100 to take the route to the right is imaged, an image displayed in the image display maximum range PN may vary depending on the location of the image of the marker in a detection range in which the image of the marker is detected and the shape of the outer frame of the image of the marker. In this case, when the image of the marker is detected on the right in the detection range and the outer frame of the image of the marker of the square outer frame is detected as a trapezoidal image, the user seeks to turn the T-junction to the left, and "WRONG WAY" as a character image corresponding to the image of the marker may be displayed in the display range PN. Conversely, when the image of the marker is detected on the left in the detection range and the outer frame of the image of the marker is detected as a trapezoidal image, the user seeks to turn the T-junction to the right, and "RIGHT WAY" as a character image may be displayed in the display range PN.

B2. Modified Example 2

In the above described embodiment, the marker is detected when the area image AI contains the image of the entire marker, however, the method of detecting the marker may be variously modified. For example, the area image AI may not be displayed, but the marker contained in the imaged image imaged by the camera 61 may be detected. Or, after the marker is contained in the imaged image, the area image AI may be displayed. Further, the shape of the range within the area image AI may be set by the user.

If an imaged image contains a plurality of markers, the marker determination part 165 may detect a marker whose outer frame has the maximum size and display the image corresponding to the maximum marker, but may not display images corresponding to the other markers. In the modified example, the image of the maximum marker is automatically detected from the plurality of markers, and thereby, the marker closest to the user may be automatically detected and convenience of the user may be improved.

Figure 11:
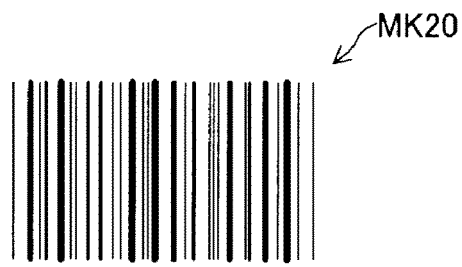
FIG. 11 is an explanatory diagram showing an example of the marker in a modified example.
Figure 12:
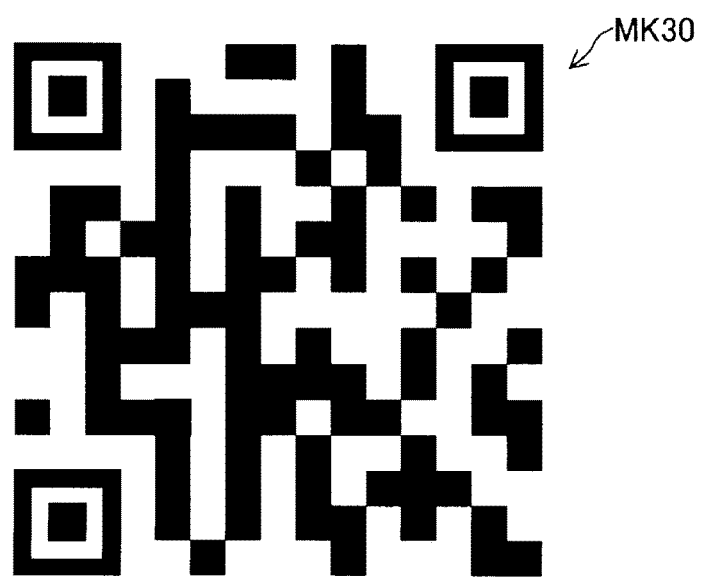
FIG. 12 is an explanatory diagram showing an example of the marker in a modified example.
Figure 13:
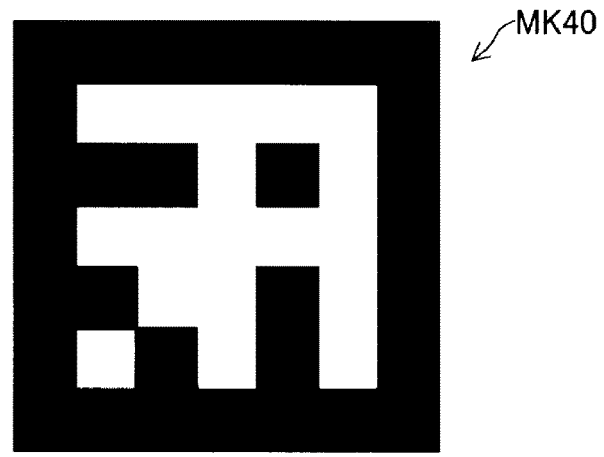
FIG. 13 is an explanatory diagram showing an example of the marker in a modified example.

FIGS. 11 to 13 are explanatory diagrams showing examples of the markers in modified examples. FIG. 11 shows the example of a barcode detected as a marker. FIG. 12 shows the example of a QR code (registered trademark) detected as a marker. FIG. 13 shows the example of an ID marker detected as a marker. The marker determination part 165 may detect the markers shown in FIGS. 11 to 13 or detect markers uniquely created with respect to each distribution center.

Further, in the above described embodiment, the marker MK1 is an image including a white area and a black area in a square, however, the marker is not limited to that, but may be variously modified. For example, the outer frame of the marker may be a rectangular shape or a circular shape. Or, as the marker, other colors than white or black (e.g., red) may be used. In the modified example, a marker using other colors than white or black is created, and thereby, even a smaller marker may provide more information to the user compared to the marker formed in white and black only.

B3. Modified Example 3

In the above described embodiment, the operation part 135 is formed in the control unit 10, however, the form of the operation part 135 may be variously modified. For example, a user interface as the operation part 135 may be provided separately from the control unit 10. In this case, the operation part 135 is separated from the control unit 10 with the power source 130 etc. formed therein, and the part may be downsized and the operability of the user is improved. Further, the camera 61 is formed in the image display unit 20, however, the camera 61 may be provided separately from the image display unit 20 and image outside sceneries.

For example, the image light generation part may include an organic EL (Organic Electro-Luminescence) display and an organic EL control unit. Further, for example, for the image generation part, in place of the LCD, an LCOS (Liquid crystal on silicon, LCOS is a registered trademark), a digital micromirror device, or the like may be used. Furthermore, for example, the invention may be applied to a laser retina projection-type head mounted display.

Further, for example, the head mounted display device 100 may have a form having an optical image display part that covers only a part of the eye of the user, in other words, a form of an optical image display part that does not completely cover the eye of the user. Furthermore, the head mounted display device 100 may be the so-called monocular-type head mounted display. In addition, the head mounted display device 100 is the binocular-type optically-transmissive head mounted display, however, the invention may be similarly applied to a head mounted display device in other forms including a video-transmissive type, for example.

Further, ear-fit-type or headband-type earphones may be employed or the earphones may be omitted. Furthermore, the head mounted display device may be formed as a head mounted display device mounted on a vehicle of an automobile, an airplane, or the like, for example. In addition, for example, the head mounted display device may be formed as a head mounted display device build in a body protector including a hardhat.

D4. Modified Example 4

The configuration of the head mounted display device 100 in the embodiment is just an example and may be variously modified. For example, the arrow key 16 provided in the control unit 10 may be omitted or another operation interface such as an operation stick may be provided in addition to the arrow key 16 and the track pad 14 or in place of the arrow key 16 and the track pad 14. Further, the control unit 10 may have a configuration to which an input device such as a keyboard or mouse can be connected and receive input from the keyboard or the mouse.

Furthermore, as the image display unit, in place of the image display unit 20 worn like spectacles, an image display unit of another system such as an image display unit worn like a hat may be employed, for example. Further, the earphones 32, 34 may be appropriately omitted. Furthermore, in the above described embodiment, the LCD and the light source are used as the configuration of generating image light, however, in place of them, another display device such as an organic EL display may be employed.

Figure 14A:
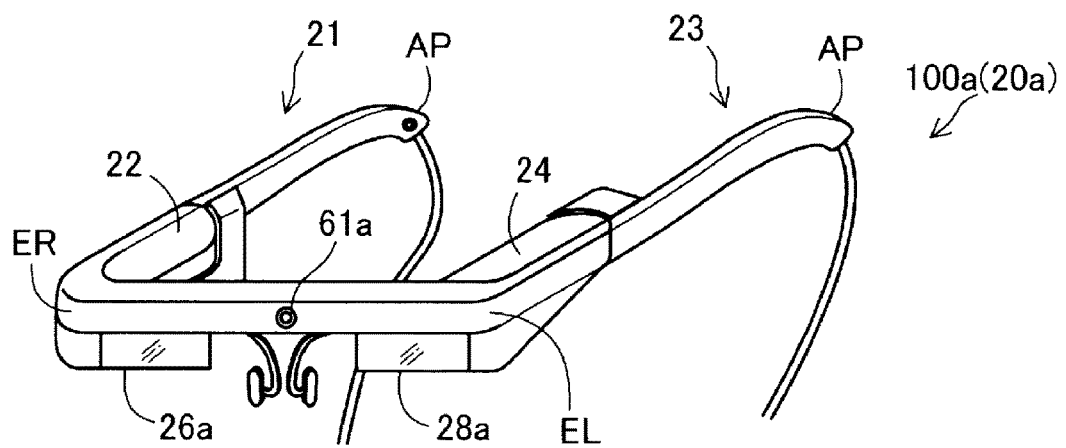
FIGS. 14A and 14B are explanatory diagrams showing outer configurations of head mounted display devices in modified examples.
Figure 14B:
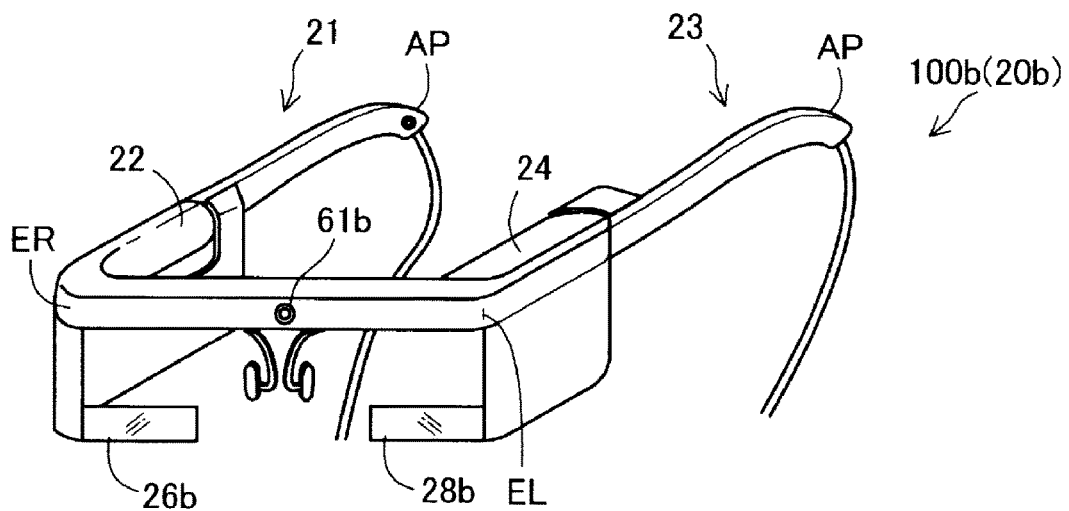

FIGS. 14A and 14B are explanatory diagrams showing outer configurations of head mounted display devices in modified examples. In the case of the example of FIG. 14A, the difference from the head mounted display device 100 shown in FIG. 1 is that an image display unit 20a includes a right optical image display part 26a in place of the right optical image display part 26 and a left optical image display part 28a in place of the left optical image display part 28. The right optical image display part 26a is formed to be smaller than the optical members of the above described embodiment, and provided in the obliquely upper part of the right eye of the user when a head mounted display device 100a is worn. Similarly, the left optical image display part 28b is formed to be smaller than the optical members of the above described embodiment, and provided in the obliquely upper part of the left eye of the user when the head mounted display device 100a is worn. In the case of the example of FIG. 14B, the difference from the head mounted display device 100 shown in FIG. 1 is that an image display unit 20b includes a right optical image display part 26b in place of the right optical image display part 26 and a left optical image display part 28b in place of the left optical image display part 28. The right optical image display part 26b is formed to be smaller than the optical members of the above described embodiment, and provided in the obliquely lower part of the right eye of the user when the head mounted display is worn. The left optical image display part 28b is formed to be smaller than the optical members of the above described embodiment, and provided in the obliquely lower part of the left eye of the user when the head mounted display is worn. As described above, it is only necessary that the optical image display unit is provided near the eye of the user. Further, the sizes of the optical members forming the optical image display unit may be arbitrary, and the head mounted display device 100 in which the optical image display unit covers only a part of the eye of the user, in other words, the optical image display unit does not completely cover the eye of the user may be implemented.

Further, in the above described embodiment, the head mounted display device 100 may guide image lights representing the same image to the left and right eyes of the user and allows the user to visually recognize a two-dimensional image, or may guide image lights representing different images to the left and right eyes of the user and allows the user to visually recognize a three-dimensional image.

Furthermore, in the above described embodiment, a part of the configuration implemented by hardware may be replaced by software, or, conversely, a part of the configuration implemented by software may be replaced by hardware. For example, in the above described embodiment, the image processing part 160 and the sound processing part 170 may be implemented by the CPU 140 reading out and executing computer programs, however, these functional parts may be implemented by a hardware circuit.

In addition, in the case where part or all of the functions of the invention are implemented by software, the software (computer programs) may be stored and provided in computer-readable media. In the invention, "computer-readable media" include not only portable recording media such as a flexible disk or a CD-ROM but also internal memory devices within the computer such as various RAMs and ROMs and external memory devices fixed to the computer such as a hard disk.

Further, in the above described embodiment, as shown in FIGS. 1 and 2, the control unit 10 and the image display unit 20 are formed as separate configurations, however, the configurations of the control unit 10 and the image display unit 20 are not limited to those, but may be variously modified. For example, all or part of the configurations formed in the control unit 10 may be formed inside of the image display unit 20. Further, the power source 130 in the embodiments may be singly formed and replaceable, or the configuration formed in the control unit 10 may be redundantly formed in the image display unit 20. For example, the CPU 140 shown in FIG. 2 may be formed in both the control unit 10 and the image display unit 20, or the functions performed by the CPU 140 formed in the control unit 10 and the CPU formed in the image display unit 20 may be separated.

The invention is not limited to the above described embodiments and modified examples, but may be implemented in various configurations without departing from the scope thereof. For example, the technical features in the embodiments and the modified examples corresponding to the technical features in the respective forms described in "SUMMARY" may be appropriately replaced or combined in order to solve part or all of the above described problems or achieve part or all of the above described advantages. Further, the technical features may be appropriately deleted unless they are described as essential features in the specification.

The entire disclosure of Japanese Patent Application No. 2013-269065, filed Dec. 26, 2013 is expressly incorporated by reference herein.

What is claimed is:

1. A head mounted display device comprising:
    an image display that enables a user to visually recognize image light based on image data as a virtual image and enables the user to visually recognize an outside scenery when worn on a head of the user;
    an image sensor that images the outside scenery; and
    a controller that, when an imaged image contains a mark image as an image of a specific mark, enables the user to visually recognize the specific virtual image associated with a combination of a type of the mark image and a shape of the mark image using the image display,
    wherein, when the imaged image contains a plurality of mark images, the controller detects the specific virtual image associated with the combination of the mark image having the maximum size among the plurality of mark images and displays the detected specific virtual image using the image display without displaying other of the plurality of mark images,
    wherein the specific virtual image is a virtual image of a first direction instruction instructing the user to move in a predetermined direction, based on the positional relationship between the device and the specific mark, and
    wherein the controller hides the specific virtual image after being displayed and enables the user to visually recognize a second direction instruction when the distance between the device and the specific mark represented by the mark image becomes smaller than a predetermined value.

2. The head mounted display device according to claim 1, wherein the specific virtual image is associated with a combination of the type of the mark image and a size of the mark image as the shape of the mark image.

3. The head mounted display device according to claim 2, wherein the controller sets a distance from the image display to a location where the specific virtual image is formed to be equal to a distance from the image display to the specific mark specified based on the combination of the type of the mark image and the size of the mark image.

4. The head mounted display device according to claim 1, wherein the specific virtual image is associated with a combination of an order of imaging of the one mark image contained in each of a plurality of imaged images, the type of the mark image, and the shape of the mark image.

5. The head mounted display device according to claim 1, wherein the controller enables the user to visually recognize an area virtual image corresponding to a predetermined area in the imaged image using the image display, and enables the user to visually recognize the specific virtual image associated with the combination of the mark image contained in the predetermined area using the image display.

6. The head mounted display device according to claim 1, wherein, when the imaged image contains a plurality of the mark images, the controller enables the user to visually recognize the specific virtual image associated with the combination of the one mark image selected based on priority set for the specific mark using the image display.

7. The head mounted display device according to claim 1, wherein the specific virtual image is associated with a combination of a time when the imaged image contains the mark image, the type of the mark image, and the shape of the mark image.

8. The head mounted display device according to claim 1, wherein the specific mark is formed by a combination of a shape and colors.

9. The head mounted display device according to claim 1, wherein the specific mark is a two-dimensional mark having an outer frame of a square in which a plurality of areas are in different colors of white and black.

10. An image display system comprising:
    a plurality of specific marks;
    an image display that enables a user to visually recognize image light based on image data as a virtual image and enables the user to visually recognize an outside scenery when worn on a head of the user;
    an image sensor that images the outside scenery; and
    a controller that, when an imaged image contains the specific mark, enables the user to visually recognize the virtual image determined based on a type of the specific mark and a shape of an image of the imaged specific mark using the image display,
    wherein, when the imaged image contains a plurality of mark images, the controller detects the specific virtual image associated with the combination of the mark image having the maximum size among the plurality of mark images and displays the detected specific virtual image using the image display without displaying other of the plurality of mark images,
    wherein the specific virtual image is a virtual image of a first direction instruction instructing the user to move in a predetermined direction, based on the positional relationship between the device and the specific mark, and
    wherein the controller hides the specific virtual image after being displayed and enables the user to visually recognize a second direction instruction when the distance between the device and the specific mark represented by the mark image becomes smaller than a predetermined value.

11. A method of controlling a head mounted display device, the method comprising:
    imaging, by an image sensor, an image that contains a mark image as an image of a specific mark;
    enabling a user to visually recognize the specific virtual image associated with a combination of a type of the mark image and a shape of the mark image using an image display;
    when the imaged image contains a plurality of mark images, detecting the specific virtual image associated with the combination of the mark image having the maximum size among the plurality of mark images;
    displaying the detected specific virtual image using the image display without displaying other of the plurality of mark images,
        wherein the head mounted display device includes the image display that enables the user to visually recognize image light based on image data as a virtual image and enables the user to visually recognize an outside scenery when worn on a head of the user and an image sensor that images the outside scenery,
        wherein the specific virtual image is a virtual image of a first direction instruction instructing the user to move in a predetermined direction, based on the positional relationship between the device and the specific mark; and
    hiding the specific virtual image after being displayed and enabling the user to visually recognize a second direction instruction when the distance between the device and the specific mark represented by the mark image becomes smaller than a predetermined value.

12. The head mounted display device according to claim 1, wherein the second direction instruction is an instruction to return to a previous location.

* * * * *